(12) United States Patent
Karaoguz et al.

(10) Patent No.: US 9,264,671 B2
(45) Date of Patent: *Feb. 16, 2016

(54) VIDEO TRANSMISSION SYSTEM HAVING UNICAST AND MULTICAST MODES AND METHODS FOR USE THEREWITH

(71) Applicant: BROADCOM CORPORATION, Irvine, CA (US)

(72) Inventors: Jeyhan Karaoguz, Irvine, CA (US); Sherman (Xuemin) Chen, Rancho Santa Fe, CA (US); Michael Dove, Los Gatos, CA (US); David Rosmann, Irvine, CA (US); Thomas J. Quigley, Franklin, NC (US); Stephen E. Gordon, Lexington, MA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,811

(22) Filed: Jan. 12, 2015

(65) Prior Publication Data

US 2015/0128202 A1    May 7, 2015

Related U.S. Application Data

(63) Continuation of application No. 12/190,024, filed on Aug. 12, 2008, now Pat. No. 9,015,780.

(60) Provisional application No. 61/054,677, filed on May 20, 2008.

(51) Int. Cl.
| | |
|---|---|
| *H04N 7/173* | (2011.01) |
| *H04N 21/414* | (2011.01) |
| *H04N 21/61* | (2011.01) |
| *H04N 21/6405* | (2011.01) |
| *H04N 21/6408* | (2011.01) |
| *H04N 21/239* | (2011.01) |
| *H04N 21/258* | (2011.01) |
| *H04N 21/266* | (2011.01) |

(52) U.S. Cl.
CPC ....... *H04N 7/17318* (2013.01); *H04N 7/17336* (2013.01); *H04N 21/2393* (2013.01); *H04N 21/25841* (2013.01); *H04N 21/266* (2013.01); *H04N 21/41407* (2013.01); *H04N 21/6131* (2013.01); *H04N 21/6405* (2013.01); *H04N 21/6408* (2013.01)

(58) Field of Classification Search
CPC .................................................. H04N 7/17318
See application file for complete search history.

(56) References Cited

U.S. PATENT DOCUMENTS

| | | | | |
|---|---|---|---|---|
| 6,047,327 | A * | 4/2000 | Tso et al. | 709/232 |
| 7,882,233 | B2 * | 2/2011 | Epstein et al. | 709/226 |
| 8,875,205 | B2 * | 10/2014 | Quigley et al. | 725/100 |
| 9,015,780 | B2 * | 4/2015 | Karaoguz et al. | 725/93 |
| 2004/0042479 | A1 * | 3/2004 | Epstein et al. | 370/432 |
| 2004/0203630 | A1 * | 10/2004 | Wang | 455/414.1 |
| 2005/0071882 | A1 * | 3/2005 | Rodriguez et al. | 725/95 |
| 2007/0266396 | A1 * | 11/2007 | Estermann | 725/25 |

* cited by examiner

*Primary Examiner* — Jun Fei Zhong
(74) *Attorney, Agent, or Firm* — Garlick & Markison; Bruce E. Stuckman

(57) ABSTRACT

A video transmission system includes a video server module that selectively operates in a unicast mode and a multicast mode, wherein the video server module generates a video signal that includes a unicast video signal when the video server module is in the unicast mode and that includes a multicast video signal when the video server module is in the multicast mode. A wireless access device transmits the video signal to at least one mobile video device.

20 Claims, 11 Drawing Sheets

Video processing system 125

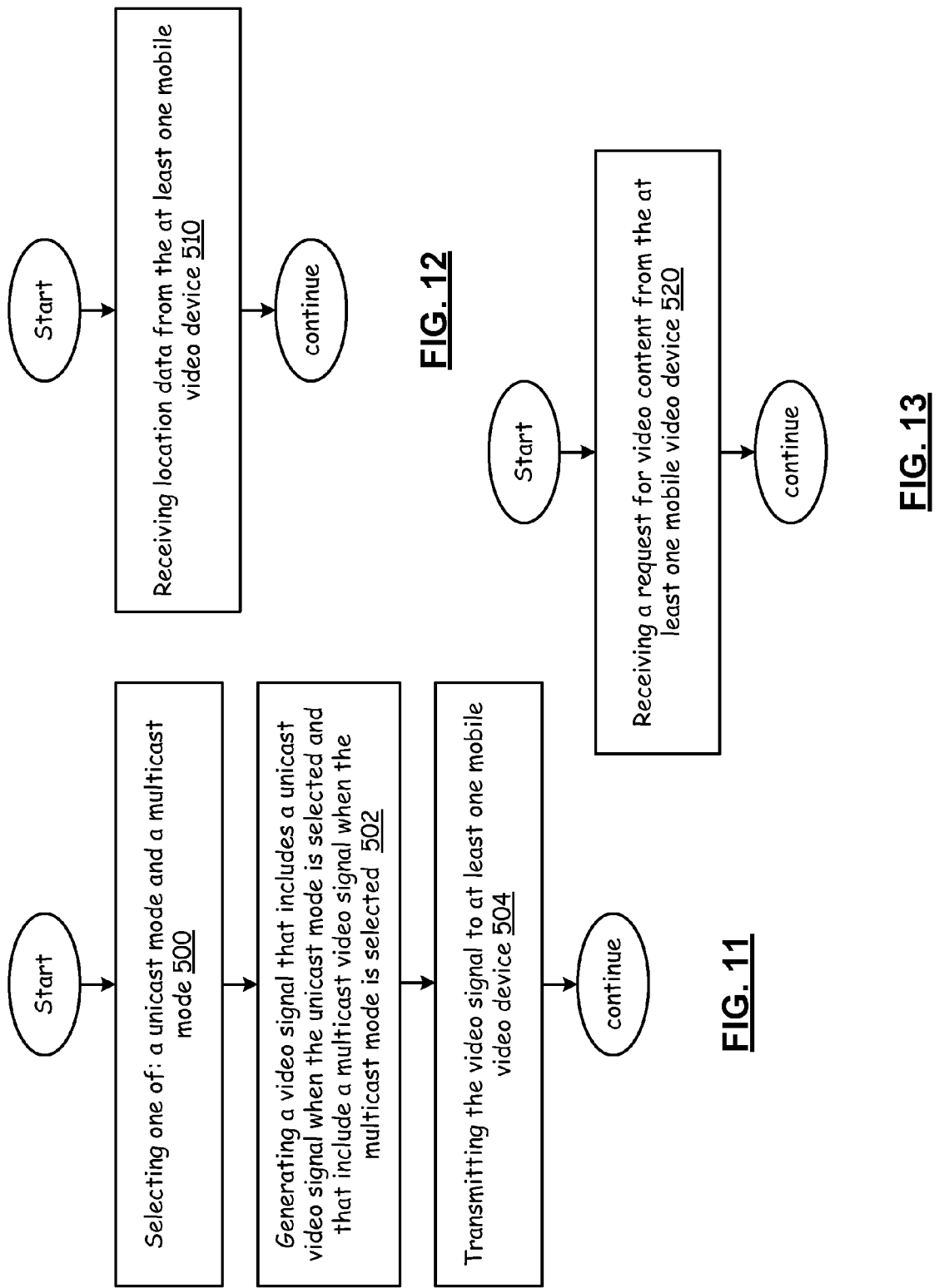

VIDEO TRANSMISSION SYSTEM HAVING
UNICAST AND MULTICAST MODES AND
METHODS FOR USE THEREWITH

CROSS-REFERENCE TO RELATED
APPLICATIONS

The present U.S. Utility Patent Application claims priority pursuant to 35 U.S.C. §120 as a continuation of U.S. Utility application Ser. No. 12/190,024, entitled "VIDEO TRANSMISSION SYSTEM HAVING UNICAST AND MULTICAST MODES AND METHODS FOR USE THEREWITH", filed Aug. 12, 2008, which claims priority pursuant to 35 U.S.C. §119(e) to U.S. Provisional Application No. 61/054,677, entitled "VIDEO TRANSMISSION SYSTEM HAVING UNICAST AND MULTICAST MODES AND METHODS FOR USE THEREWITH", filed May 20, 2008, both of which are hereby incorporated herein by reference in their entirety and made part of the present U.S. Utility Patent Application for all purposes.

The present application is related to U.S. Patent Application, MOBILE VIDEO DEVICE HAVING UNICAST AND MULTICAST MODES AND METHODS FOR USE THEREWITH, having Ser. No. 12/190,046, filed on Aug. 12, 2008, issued as U.S. Pat. No. 8,875,205 on Oct. 28, 2014.

BACKGROUND OF THE INVENTION

1. Technical Field of the Invention

This invention relates generally to the transmission and processing of video signals and devices that use such video signals.

2. Description of Related Art

Communication systems provide several options for obtaining access to broadcast video content. Consumers can receive broadcast standard definition and high definition television broadcasts from the air with an antenna. Analog and digital cable television networks distribute a variety of television stations in most communities on a subscription basis. In addition, satellite television and new internet protocol (IP) television services provide other subscription alternatives for consumers. Analog video signals can be coded in accordance with a number of video standards including NTSC, PAL and SECAM. Digital video signals can be encoded in accordance with standards such as Quicktime, (motion picture expert group) MPEG-2, MPEG-4, or H.264. In addition to digital coding, some video signals are scrambled to provide access to these signals, only to the subscribers that have paid to access the particular content.

The desire for video content has driven cellular telephone networks to begin offering video programs to their subscribers as streaming video. In this fashion, users of mobile devices can have access to video programming on the go. Some of the techniques used in providing broadcast video content to stationary devices are not suitable for adaptation to the viewing environment associated with a handheld mobile device.

The limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL
VIEWS OF THE DRAWING(S)

FIG. 1 presents a block diagram representation of a video network 102 in accordance with an embodiment of the present invention;

FIG. 2 presents a block diagram representation of a video processing system 125 in accordance with an embodiment of the present invention;

FIG. 3 presents a block/pictorial diagram representation of a portion of a video processing system in accordance with an embodiment of the present invention;

FIG. 4 presents a block diagram representation of a mobile video device 110 in accordance with an embodiment of the present invention;

FIG. 5 presents a pictorial representation of a mobile device 200 in accordance with an embodiment of the present invention;

FIG. 6 presents a pictorial representation of a mobile device 200 in accordance with another embodiment of the present invention;

FIG. 7 presents a pictorial representation of a mobile device 200 in accordance with another embodiment of the present invention;

FIG. 11 is a flowchart representation of a method in accordance with the present invention;

FIG. 12 is a flowchart representation of a method in accordance with the present invention;

FIG. 13 is a flowchart representation of a method in accordance with the present invention;

DETAILED DESCRIPTION OF THE INVENTION

Figure 1:
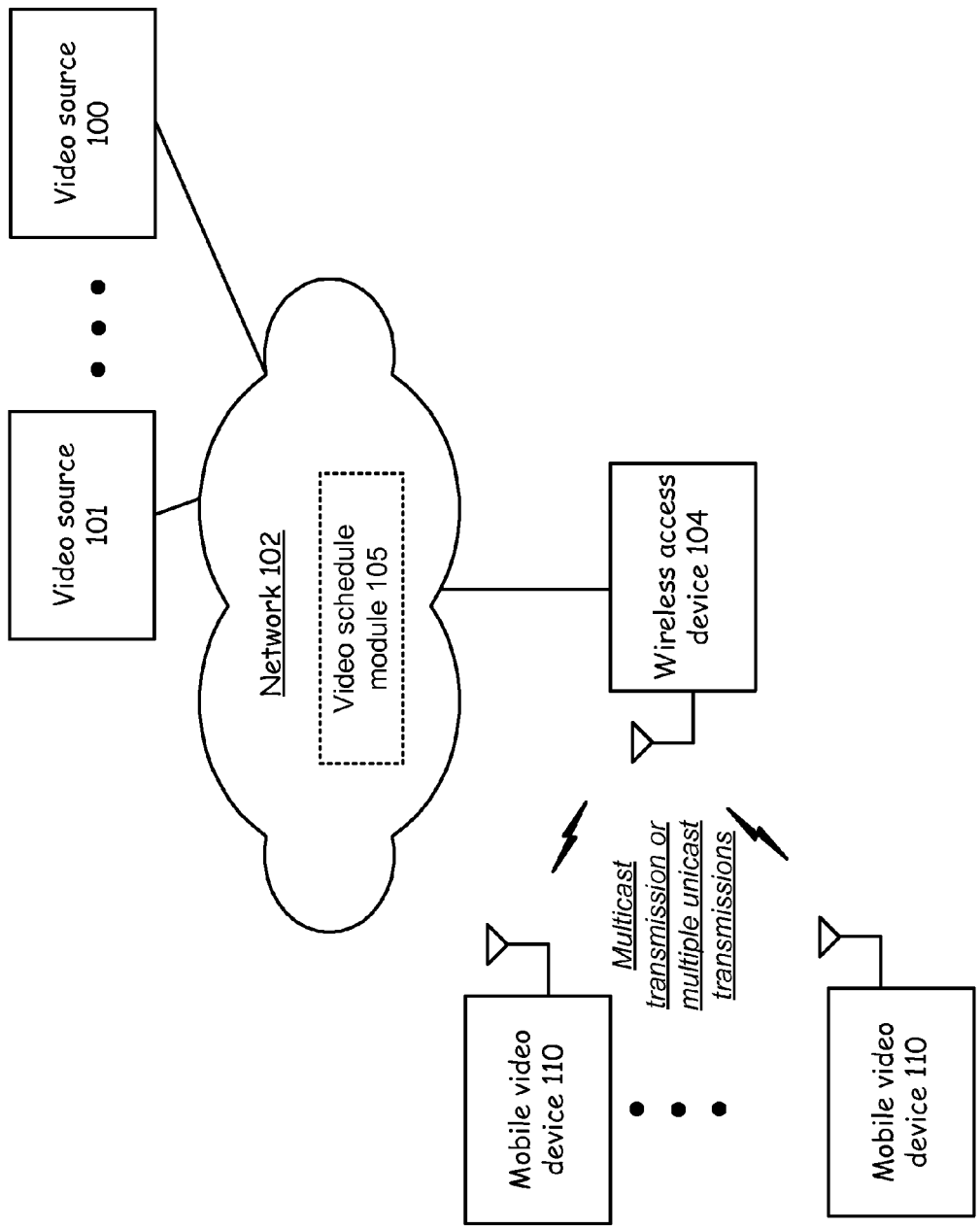

FIG. 1 presents a block diagram representation of a video network 102 in accordance with an embodiment of the present invention. A network 102 is shown that distributes information such as video content from a plurality of video sources including video sources 100 and 101 to a wireless access device 104 for wireless transmission to wireless video devices such as one or more mobile video devices 110 or other video devices. The video content can include movies, television shows, commercials or other ads, educational content, infomercials, or other program content and optionally additional data associated with such program content including but not limited to digital rights management data, control data, programming information, additional graphics data and other data that can be transferred in association with program content. The video content can include video with or without associated audio content and be sent as a digital video file, broadcast video, streaming video, video on demand and near video on demand programming and/or other formats.

The network 102 can be a dedicated video distribution network such as a direct broadcast satellite network or cable television network that distributes video content to a plurality of wireless access devices and optionally wired devices over a wide geographic area. In the alternative, network 102 can be a heterogeneous network that includes one or more segments of a general purpose network such as the Internet, a metropolitan area network, wide area network, local area network or other network and optionally other networks such as an Internet protocol (IP) television network.

The video content can be carried as analog signals such as National Television System Committee (NTSC), Séquentiel couleur à mémoire (SECAM) or Phase Alternating Line (PAL) coded video signals, or digital video signals such as Quicktime, (motion picture expert group) MPEG-2, MPEG-4, H.264, or other format, either standard or proprietary that are carried via an IP protocol such as TCP/IP, Ethernet protocol, Data Over Cable Service Interface Specifications (DOCSIS) protocol or other protocol.

Wireless access device 104 can include a base station or access point that provides video content to a plurality of video subscribers over a cellular network such as an Universal Mobile Telecommunications System (UMTS), enhanced data rates for GSM evolution (EDGE), 3G, 4G or other cellular data network, a wireless local area network (WLAN) such as an 802.11a,b,g,n, WIMAX, or other WLAN network. In addition, the wireless access device 104 can include a home gateway, video distribution point in a dedicated video distribution network or other wireless gateway for wirelessly transmitting video content either alone or in association with other data, signals or services, to one or more mobile video devices 110 and/or other video devices.

Mobile video device 110 can include a video enabled wireless telephone or other handheld communication device with wireless connectivity via a wireless data card, wireless tuner, WLAN modem or other wireless link or device that alone or in combination with other devices is capable of receiving video content from wireless access point 104 and storing and/or displaying the video content for a user.

Network 102 includes a video server module 105 that selectively operates in a unicast mode and a multicast mode. In particular, video server module generates a video signal that includes video content from one or more video sources such as video source 100 and 101 and sends the video signal to wireless access device 104 for distribution to one or more mobile access devices 110. The video signal generated by video server module 105 includes a unicast video signal when the video server module is in the unicast mode and includes a multicast video signal when the video server module is in the multicast mode.

Video server module 105 can include a server, headend, edge device, router, switch, hub, gateway, interworking device or other network module that receives and/or stores video content 106 and produces either a multicast or unicast video signal for transmission to one or more mobile video devices 110. In an embodiment of the present invention, the video server module 105 receives mobile device feedback such as a location data, requests for particular video content and/or other data from one or more mobile video devices 110 that can be used by video server module 105 in determining whether to generate a unicast or multicast video signal that contains particular video content. Further, the video server optionally sends a mode indication to wireless access device 104 that indicates either multicast or unicast mode and wireless access device 104 modifies its transmission parameters based on the particular mode that is indicated.

The video source 100, network 102, wireless access device 104, mobile video device 110 and/or video server module 105 include one or more features of the present invention that will be described in greater detail in conjunction with FIGS. 2-15 that follow.

Figure 2:
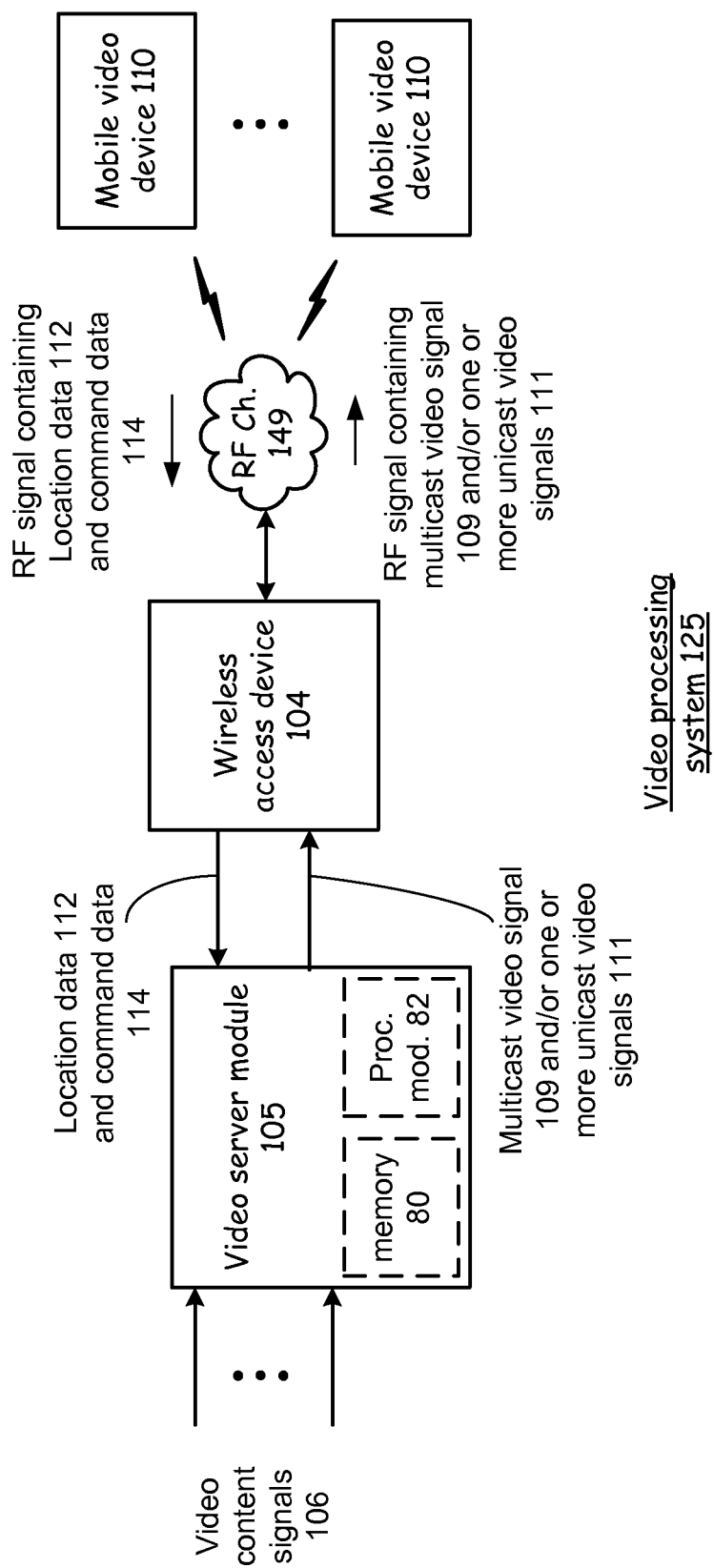

FIG. 2 presents a block diagram representation of a video processing system 125 in accordance with an embodiment of the present invention. A video processing system 125 is shown that can be used in conjunction with network 102.

Video server module 105 receives video signals 106 that include video content from one or more video sources 100, 101, etc. These video signals 106 can be stored by video server module 105 in an associated memory such as a hard drive, storage array, network attached storage or storage area network as a digital video file that can be retrieved and processed to produce a multicast video signal 109 or unicast video signal 111. Further, one or more video signals can be processed by video server module 105 to generate a multicast video signal 109 or unicast video signal 111 on a real-time basis. In an embodiment of the present invention the unicast video signals 111 and multi-cast video signals 109 are digital video signals that include encoded audio and video content and optionally include navigation data such as metadata regarding the title, running time, actors, program synopsis, and further still images and/or video clips that can be used by a video device such as mobile video device to describe the video content to the user as part of a program listing, guide or other selection, search or navigation process. As will be understood, some or all of navigation data can be sent prior to the transmission of the video signal and be used by the mobile video device 110 in a selection mode that allows a user to select a particular video program to view as either a unicast or multicast transmission.

The processing of video signals 106 by video server module 105 can include preparing a unicast video signal 111 from a particular one of the video signals 106 by addressing the unicast video signal with an address such a an IP address, mobile identification number or other device address of the particular mobile video device 110 that is to receive this particular unicast video signal 111. In this fashion, the unicast video signal 111 can be routed via network 102 to the particular mobile video device 110. Further, video server module 105 can prepare a multicast video signal 109 from a particular one of the video signals 106 by addressing the multicast video signal with a group address or a group of addresses corresponding to a particular group of mobile video devices 110 that are to receive this particular multicast video signal 109. In an embodiment of the present invention, multicast video signal 109 is prepared by video server module 105 in accordance with a Protocol Independent Multicast such as Sparse Mode, Dense Mode, Source Specific Mode, or Bidirectional Mode; in accordance with an Explicit Multi-Unicast; or in accordance with another multicasting protocol.

In an embodiment of the present invention, video server module 105 can optionally include a video encoder that converts one or more analog video signals 106 into a digital format. In addition, video server module 105 can include a video transcoder that transcoder converts one or more video signals 106 from one digital format to another digital format. In this fashion, the format of one or more video signals 106 can be modified to conform with a desired format for storage as digital video files or for transmission as unicast video signal 111 or multicast video signal 109. In addition, a stored digital video file can be retrieved and transcoded to conform with a desired format for transmission as unicast video signal 111 or multicast video signal 109.

In an embodiment of the present invention, video server module 105 can include a processing module 82 that is implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module such as memory 80. When processing module 82 is implemented with two or more devices, each device can perform the same steps, processes or functions in order to provide fault tolerance or redundancy. Alternatively, the function, steps and processes performed by processing module 82 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, disk drive, storage array, network attached storage, storage area network and/or any other device that stores digital information. Note that when the processing module 82 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

Wireless access device 104 includes a transceiver that creates RF signals containing the multicast video signal 109 or unicast video signal 111 for transmission to mobile video device 110 via one or more RF communication channels 149. In addition, wireless access device 104 receives an RF signal containing location data 112, command data 114 and/or other mobile device feedback from one or more of the mobile devices 110. This location data 112, command data 114 and other mobile device feedback can be sent to video server module 105 and used in conjunction with the provision of video services to the mobile video devices 110.

As discussed in conjunction with FIG. 1, video server module 105 selectively operates in a unicast mode and a multicast mode. In an embodiment of the present invention, the video server module 105 uses location data 112, command data 114 and/or other mobile device feedback data received via wireless access device 104 as a basis for selecting either the multicast mode or the unicast mode.

For example, a plurality of mobile video devices 110 can generate command data 114 that includes a request or selection of a single video program, such as a particular instance of video signals 106 or a stored video program. If after comparing the location data 112 for each of these mobile video devices 110, video server module 105 determines that multiple requests come from mobile video devices that are each in proximity to wireless access device 104, video server module 105 can establish a multicast for this video programming and generate a multicast video signal 109 in response thereto. In this fashion, a plurality of mobile video devices 110 can each access the multicast video signal 109 via wireless access device 104.

When a single request for a video program is received by video server module 105, video server module 105 can operate in the unicast mode to generate a unicast video signal 111 that is addressed to the particular mobile video device 110 that requested such a program via command data 114. In other examples, video server module 105 can establish a multicast in response to a single request for a video program when, for instance, video server module 105 determines that it is likely that other mobile video devices 110 may wish to join the multicast. For instance, in circumstances where the particular instance of video signal 106 that is requested corresponds to a video program associated with a place of interest, and a request is received from a mobile video device 110 that is determined via location data 112 to be in the vicinity if this place of interest, video server module 105 can determine, based on a lookup table or other logic, that a multicast should be established because other mobile video devices 110 will likely wish to join the multicast. In this fashion, when requests arrive via command data 114 from other mobile video devices 110 that wish to access this particular video programming and/or to join a multicast that is already in progress, these mobile video devices 110 can be joined to the multicast by associating these devices with the group address associated with the multicast or by preparing additional multi-unicast transmissions.

For example, a particular video program may be an enhanced video feed or interactive video program that is associated with a football game. Video server module 105 can include a lookup table that associates this video program to the location of the football stadium that hosts the game. When a request to view this video program is received from a mobile video device 110 in the vicinity of the football stadium, the video server module 105 determines this fact by comparing the location data 112 with the location stored in the lookup table in association with the video program. When the location data 112 correlates with the location stored in the lookup table, the video server module 105 can generate a multicast video signal 109, based on this single request, in anticipation that other mobile video devices will wish to join the multicast.

In another example, video server module 105 can include a lookup table that stores the location of various commonly used roadways and optionally periods of the day associated with heavy use. When a request arrives via command data 114 from a mobile video device 110 is received having a location determined via location data 112 that correlates to such a roadway (and optionally during a time corresponding to heavy use such as a "rush hour" time period), the video server module 105 can generate a multicast video signal 109, based on this single request, in anticipation that other mobile video devices will wish to join the multicast.

In a further example, video server module can store data derived from historical viewing patterns, request frequencies and/or the geographical clustering of requests that are used by a model or other algorithm to determine that additional requests to view a particular video program are likely and, in response, the video server module 105 enters a multicast mode and generate a multicast video signal 109 in response to a single request to view this program.

Figure 3:
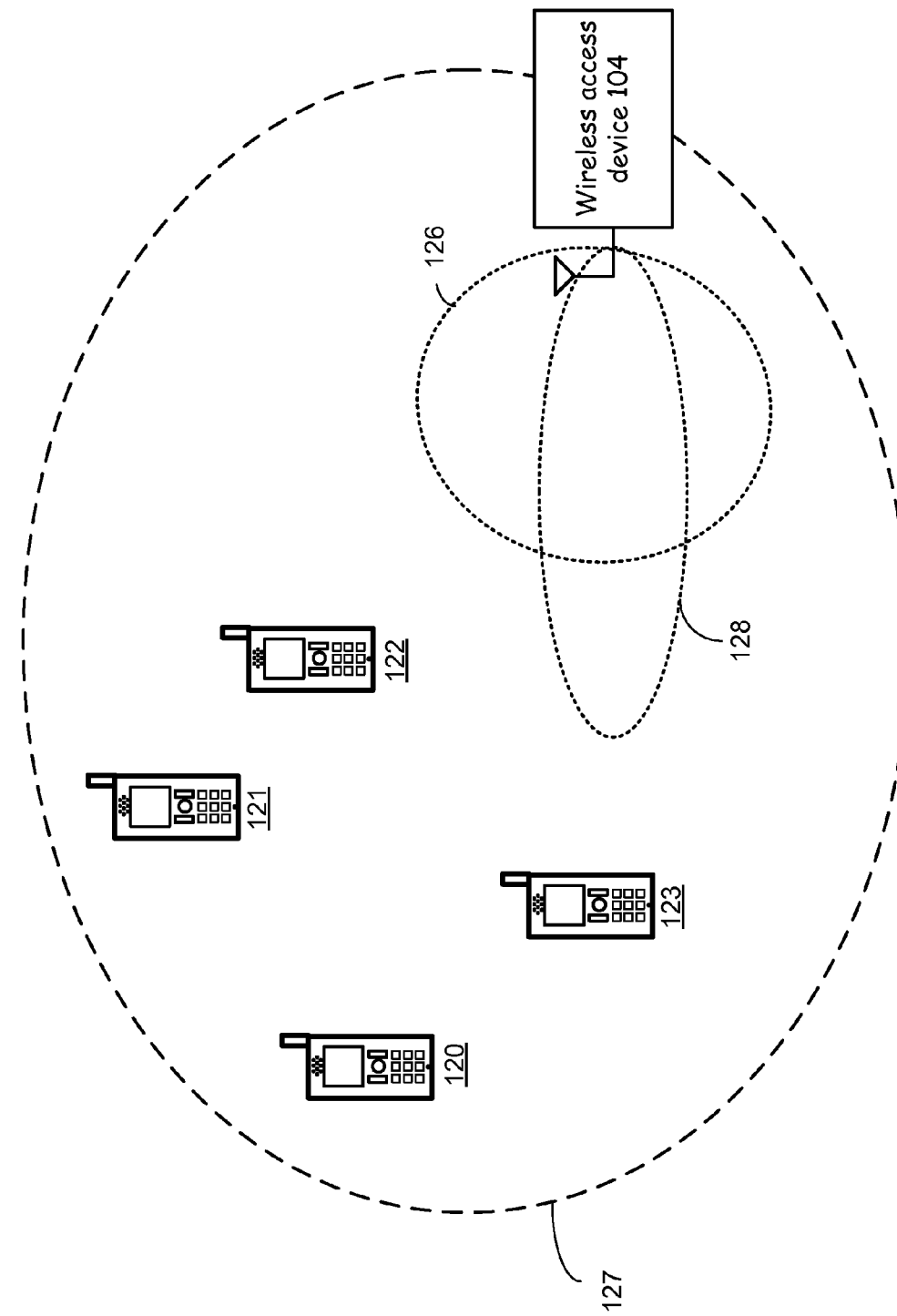

FIG. 3 presents a block/pictorial diagram representation of a portion of a video processing system in accordance with an embodiment of the present invention. In particular, a vicinity 127 is shown that includes wireless access device 104 and mobile video devices 120-123.

In this mode of operation, the protocol used to communicate between video server module 105 and wireless access device 104 indicates the use of multicast mode in conjunction with the transmission of multicast video signal 109 or otherwise indicates the particular mode (multicast or unicast) that is being employed. In addition, the wireless access device 104 includes an antenna such as beamforming antenna 44 that includes an antenna array or other multi-element design having a controllable antenna beam. Further wireless access device 104 includes a transmitter section having an adjustable power level.

In response to the mode indication, the wireless access device 104 can conform its own mode of operation to either a unicast mode or a multicast mode of operation. For instance, the wireless access device 104 can selectively adjusts its transmit power level, an antenna beam pattern, and or other transmission parameters based on a selection of either the unicast mode or the multicast mode. In one example, the wireless access device 104 can adjust the antenna beam of a beamforming antenna in the unicast mode to a directional pattern 128 in the direction of a mobile video device 123 that is receiving a unicast transmission. In a further example, wireless access device 104 can adjust the antenna beam to a more omnidirectional pattern 126 in the multicast mode of the wireless access device to direct its transmission energy to each of the mobile video devices 120-123. In addition, the power level of transmitter section of wireless access device 104 can be increased for multicast transmissions, for instance, to compensate for the omnidirectional pattern 126 of the antenna.

Figure 4:
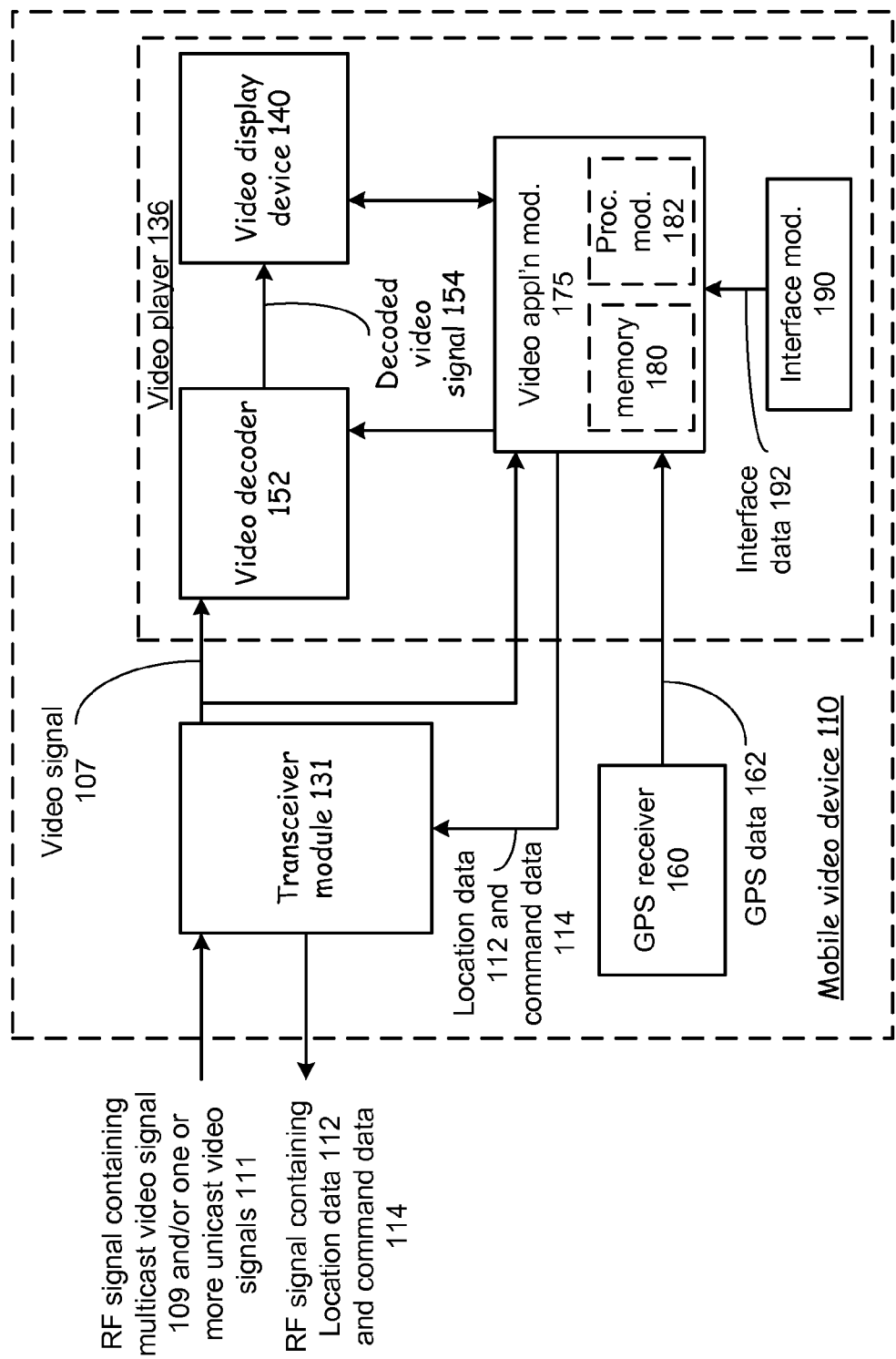

FIG. 4 presents a block diagram representation of a mobile video device 110 in accordance with an embodiment of the present invention. Mobile video device 110 includes a transceiver module 131 that receives RF signals from an external device such as wireless access device 104 containing multicast video signals 109 or unicast video signals 111. Transceiver module 131 demodulates and down converts these RF signals to extract the video signal 107. In addition, transceiver module 131 transmits an RF signal to an external device such as wireless access device 104, that contains location data 112 and command data 114 such as selections or requests to view particular video programs or other commands.

Video player 136 includes a video decoder 152 that generates a decoded video signal 154 and a video display device 140, such as plasma display, LCD display, cathode ray tube (CRT), that either directly or via projection, creates a video display for an end-user. In addition video player 136 includes an interface module 190 and a video application module 175 having a memory 180 and processing module 182 that executes an application for storing selected video signals 107 as a plurality of stored video files and playing back these video files. Interface module 190 includes one or more buttons, a keyboard, keypad, a click wheel, touch screen, a microphone, speaker and/or other user interface devices that allow the video application module 175 to interact with the user by providing prompts either directly or via screen displays that are generated by video application module 175 and displayed on video display device 140, to receive commands and other interface data 192 in response to actions of a user of mobile video device 110 that command the operation of the video player 136 and that optionally are included in command data 114.

In operation, video application module 175 can receive commands from a user to store a video signal 107 as a digital video file in memory 180. The user can also navigate the stored video files and a select a stored video file for playback. During playback, processing module 182 converts the stored video file to a video signal that is provided to video decoder 152 that operates as described in conjunction with a received video signal 107 to generate a decoded video signal 154 for display on display device 140. Interface module 190 optionally provides one or more playback control buttons such as stop, pause, fast forward, rewind, slow motion, etc., that generate interface data 192 used by processing module 182 to control the playback of a stored video file in response to user commands.

Video application module 175 optionally receives navigation data corresponding to received video signals such as unicast video signals 111 and multicast video signal 109 that can be used to by video player 136 to provide information to a user regarding what is playing. In an embodiment of the present invention, the navigation data includes a still image or video clip, such as an opening shot, a title shot, an opening clip or other still image or video clip derived from the one of the plurality of stored video files. The video application module 175 can include a video generator that can create video display screen data sent to video decoder 152 for display on video display device 140 as part of a graphical user interface that includes graphics, text and optionally merges navigation data from one or more video signals. In this fashion, video application module 175 can generate notification screens, provide information regarding one or more stored, displayed or available video programs as part of selection screens interactive video screens, etc.

Further, the navigation data is stored in association with the storage of the corresponding stored video file and used to generate selectable prompts displayed on video display device 140, such as thumbnail clips or images of the stored video files. These selectable prompts can then be selected by the user via a touch screen, pointer or other selection mechanism of interface module 190. Further navigation data for the stored video files can includes metadata or other text derived from the one of the plurality of stored video files that can be used to describe a video program being played or played-back. In addition, a user can search for a particular stored video file by inputting a search term, keyword or other text that is compared with the navigation data for the stored video files to find one or more matches.

In an embodiment of the present invention, interface module 190 includes a microphone and the user of mobile video device 111 can verbally enter interface data 192 such as commands and other input that is translated by a speech recognition routine of processing module 182. In particular, text associated with particular stored video file that the user wishes to search for can be entered by speaking the particular word or words to the device. The speech recognition routine can convert these spoken words to text that is used to locate one or more matching stored video files based on their associated navigation data. In addition, other commands such as "search", "play", "pause", etc. can be entered by the user as speech commands that are recognized by the speech recognition routine. In one implementation, a speaker independent speech recognition routine is implemented that can be used for converting user speech to search text and commands. Alternatively, a speaker dependent speech recognition routine can be implemented for interpreting user speech that operates based on training sets or other learned data for a particular user.

In addition, mobile device 110 includes a GPS receiver that is coupled to recover a plurality of coarse/acquisition (C/A) signals and a plurality of navigation messages from received GPS signals from one or more orbiting satellites. The GPS receiver 160 utilizes the C/A signals and the navigation messages to determine the position of the mobile video device 110 and generate GPS data 160 such as location data 112 that contains the position of the mobile video device 110, clock signals and/or real-time time and date derived from the atomic clocks onboard one or more GPS satellites. As previously discussed, the location data 112 and/or command data 114 can be sent to a network module such as video server module 105 and used to select either the multicast mode or the unicast mode for a transmission of video content.

Video decoder 152 and video application module 175 can be implemented using shared or dedicated microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module such as memory 180. When video decoder 152 and video application module 175 are implemented with two or more devices, each device can perform the same steps, processes or functions in order to provide fault tolerance or redundancy. Alternatively, the function, steps and processes performed by video decoder 152 and video application module 175 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the video decoder 152 and video application module 175 implement one or more of their functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

In a selection mode, the transceiver module 131 receives navigation data via wireless access device 104 corresponding to a plurality of video programs including at that are available for either live viewing or downloading and storage as either a unicast video program or a one multicast video program. The video application module 175 generates selection display data that is coupled to video display device 140 for display to the user as a selection screen. Interface module 190 receives interface data 192 in response to actions of a user that correspond to either a particular stored video for playback and/or a particular video programs available from the network 102. When a network video program is selected, video application module 175 prepares command data 114 that includes the selection/request data corresponding to the selected video program and optionally location data 112 that is transmitted via transceiver module 131 to the network, such as video server module 105. As previously discussed, video server module 105 sends either a multicast video signal 109 or unicast video signal 111 that is received by transceiver module 131 and converted to video signal 107 for either decoding and display in a display mode or storage in the memory 180 of video application module 175 for later playback.

Figure 5:
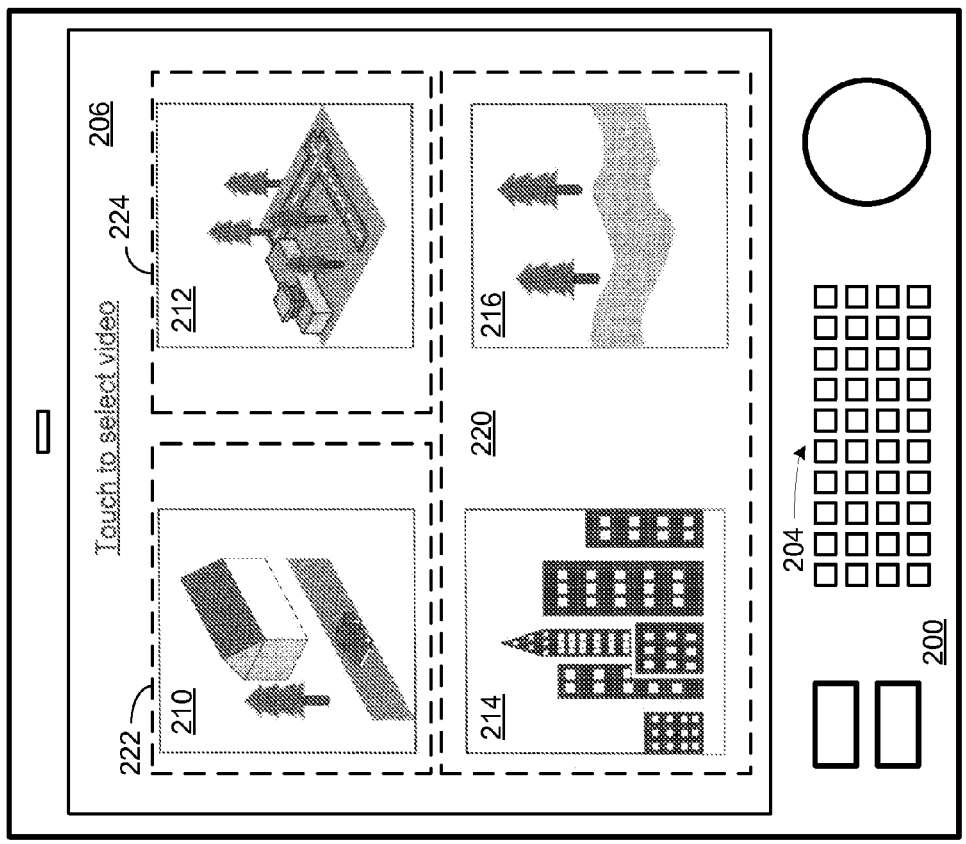

FIG. 5 presents a pictorial representation of a mobile device 200 in accordance with an embodiment of the present invention. In particular, a mobile device 200 is shown, such as mobile video device 110, with a particular screen shot on a display screen 206, such as video display device 140, relating to a selection mode of the device. In this embodiment, mobile device 200 includes a keypad 204 and other user interface devices. Display screen 206 is optionally a touch screen.

In this mode of operation, display screen 206 displays four indicia 210, 212, 214 and 216 such as video clips, still images, text and/or graphics that are generated from navigational data received from network 102 and/or stored in conjunction with a corresponding stored video files. The user selects a particular one of the four stored video files for storage, display or playback by touching the image corresponding to a selected video program, when display screen 206 is a touch screen, or by otherwise indicating a selection using a pointing device, curser or other feature of interface device 190.

In the example shown, display screen 206 displays in area 222, indicia of one or more available unicast video programs from network 102, such as indicia 210. Area 224 presents indicia of one or more available multicast video programs from network 102, such as indicia 212. Area 220 presents indicia of one or more stored video programs, such as indicia 214 and 216.

Figure 6:
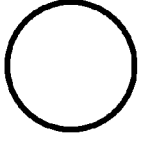

FIG. 6 presents a pictorial representation of a mobile device 200 in accordance with another embodiment of the present invention. In particular, a further screen shot of display screen 206 is shown. After the selection of a multicast or unicast video program in the prior screen, the user of mobile device may be presented costs for viewing the selected video program. In this embodiment, options are presented to the user for viewing the video program live on a real-time basis. This may be a multicast or unicast transmission and the price charged may be, for instance, greater for a unicast transmission than for a multicast program. As another option, the user may select real-time viewing of the video program but with a delay in the commencement of a program for a reduced price. For instance, when a movie is selected that is stored locally at the video server module 105, the video server module 105 could determine that there might be other users that would be interested in viewing this same video program and wait a short time, such as five or ten minutes or some other period, for other requests and create a multicast transmission in response thereto. As a further option, the user might elect to download the download of the video now, but on a non-real-time basis for storage. Further a user may elect to commence the download of the video program at a later time at a reduced fee. In this fashion, video server module 105 might also aggregate requests from several users and commence the transmission as a multicast transmission when a number of users are present in a single area.

While the fees associated with access a video program are shown on a separate screen from the indicia 210, 212, 214 and 216, in another embodiment of the present invention, the fees (and viewing options) could likewise be included with the indicia 210, 212, 214 and 216 presented in conjunction with FIG. 5.

Figure 7:
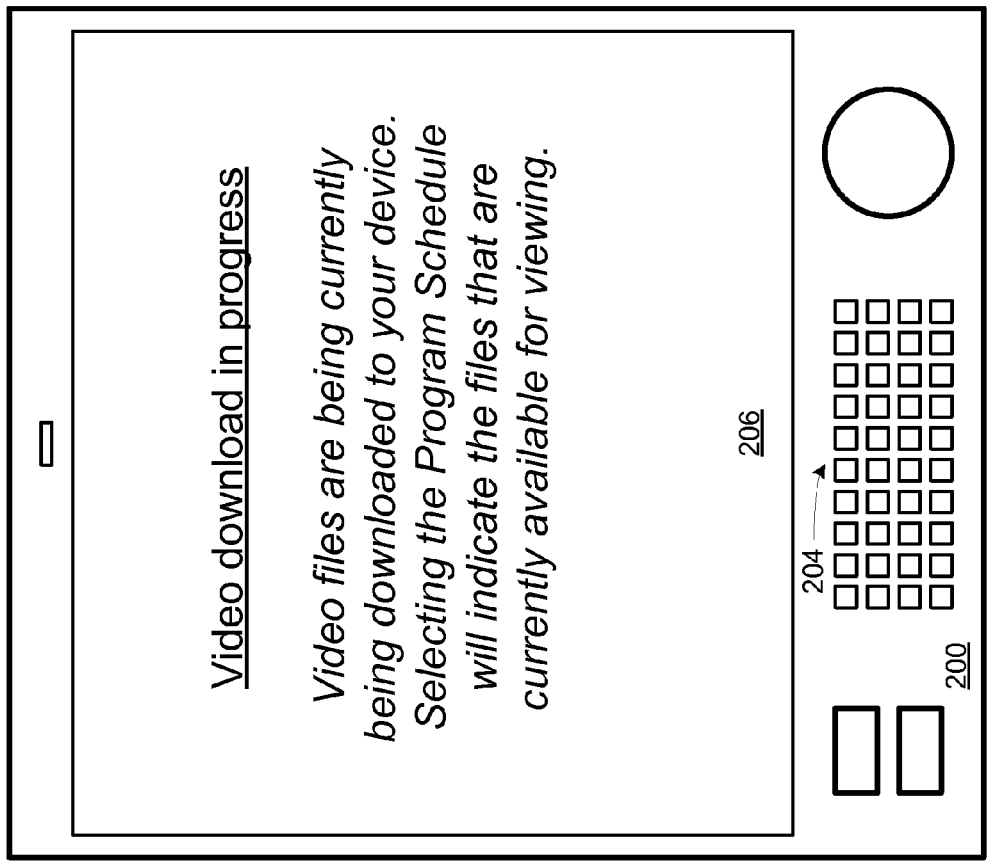

FIG. 7 presents a pictorial representation of a mobile device 200 in accordance with another embodiment of the present invention. In particular, a further screen shot of display screen 206 is shown for use in the case where a video program is downloaded and stored to the mobile device 200. In this download notification mode of operation, video application module 175 generates download notification data that corresponds to a screen display that informs a user that a download has commenced. This notification is particularly useful in circumstances where the user has elected to download a video program at a later time as discussed in conjunction with FIG. 6 or otherwise when a video download is only available in certain areas and when the user has entered such an area.

Figure 8:
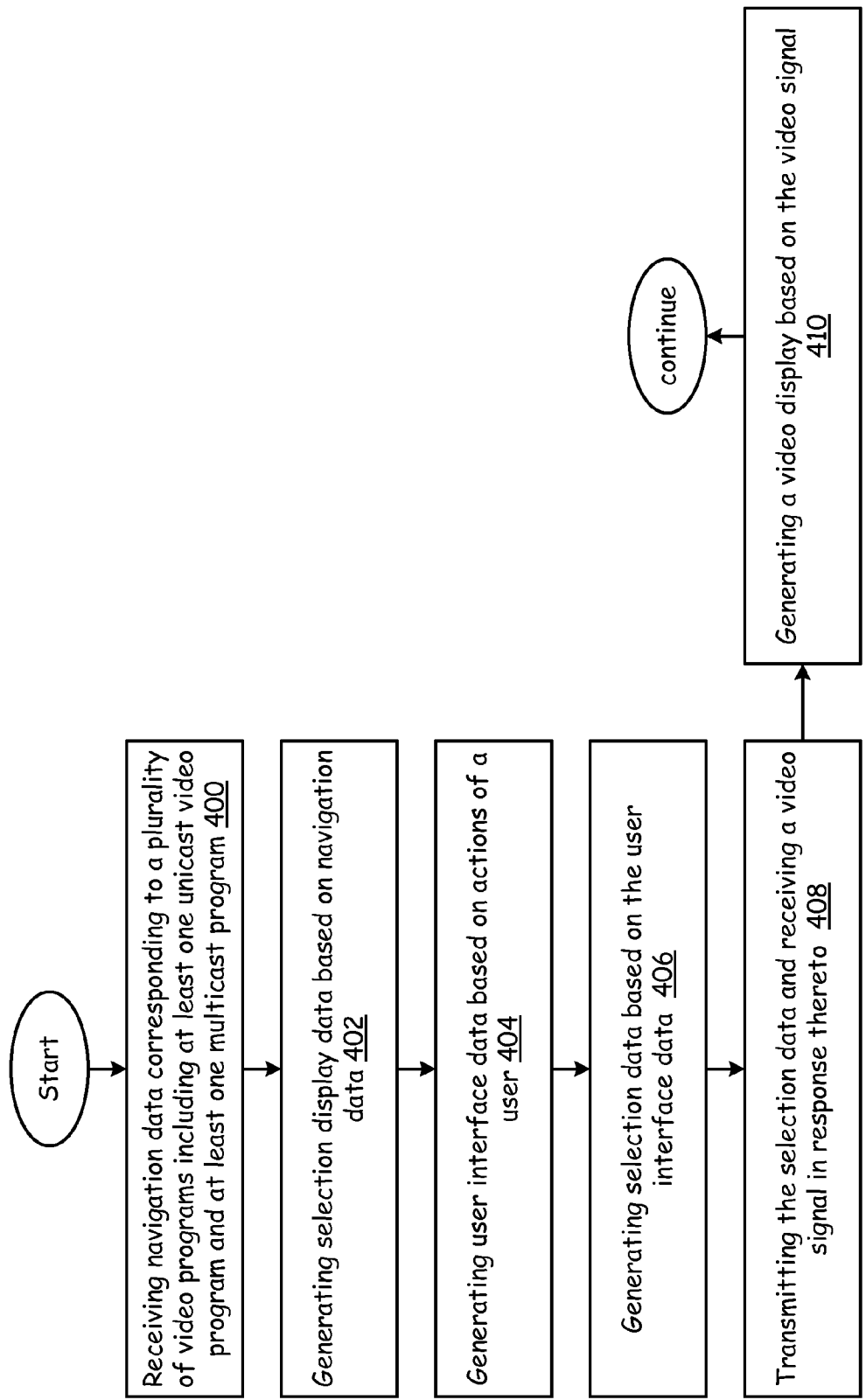
FIG. 8 is a flowchart representation of a method in accordance with the present invention.

FIG. 8 is a flowchart representation of a method in accordance with the present invention. In particular, a method is presented for use in conjunction with one or more of the functions and features described in conjunction with FIGS. 1-7. In step 400, navigation data is received corresponding to a plurality of video programs including at least one unicast video program and at least one multicast video program. In step 402, selection display data is generated based on navigation data. In step 404, a selection display is generated based on the selection display data. In step 406, user interface data is generated based on the actions of a user. In step 406, selection data is generated based on the user interface data. In step 408, the selection data is transmitted and a video signal is received in response thereto. In step 410, a video display is generated based on the video signal.

In an embodiment of the present invention, the selection display presents first indicia corresponding to the unicast video program differently than second indicia corresponding to the multicast video program. The first indicia can include a video clip, a still image text and/or graphics. The first indicia can indicate a first fee associated with viewing the unicast video program and the second indicia can indicate a second fee associated with viewing the multicast video program, wherein the second fee is less than the first fee. The selection display can include a first area that includes first indicia of the plurality of video programs.

Figure 9:
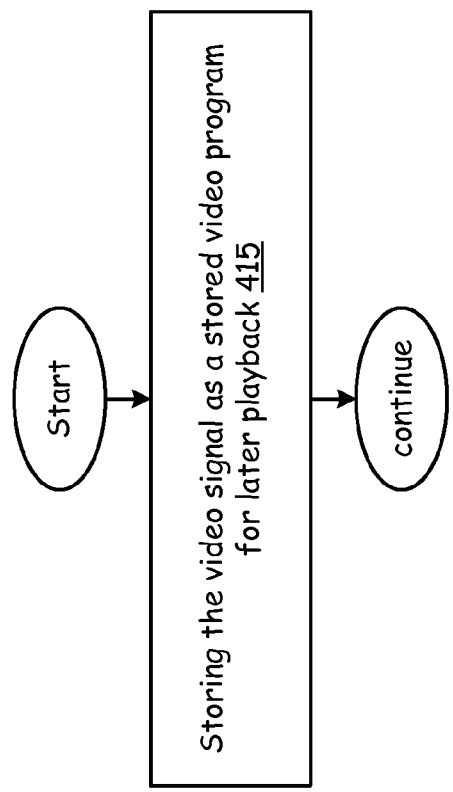
FIG. 9 is a flowchart representation of a method in accordance with the present invention.

FIG. 9 is a flowchart representation of a method in accordance with the present invention. In particular, a method is presented for use in conjunction with one or more of the functions and features described in conjunction with FIGS. 1-7 and in particular in conjunction with a method in conjunction with FIG. 8. In step 415, a video signal is stored as a stored video program for later playback and the selection display includes a second area that includes second indicia of the stored video program.

Figure 10:
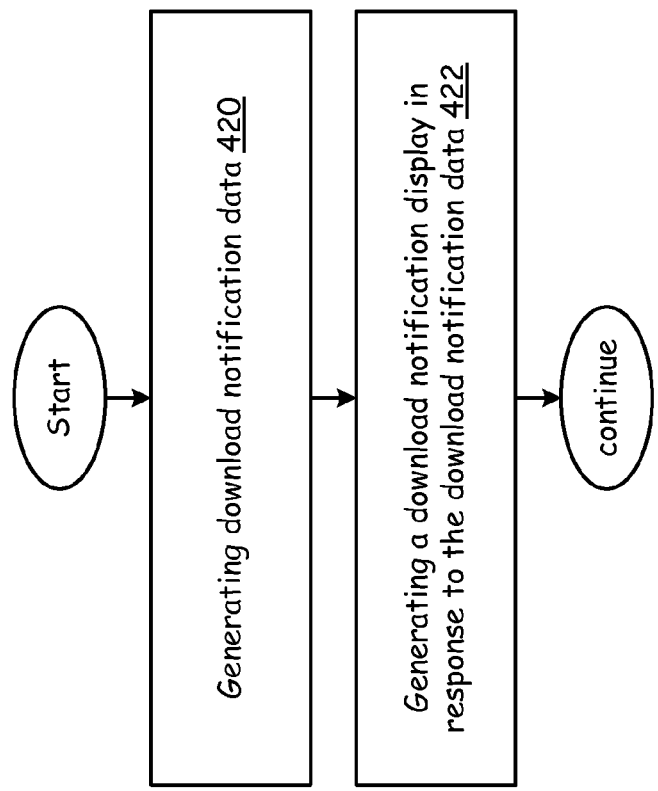
FIG. 10 is a flowchart representation of a method in accordance with the present invention.

FIG. 10 is a flowchart representation of a method in accordance with the present invention. In particular, a method is presented for use in conjunction with one or more of the functions and features described in conjunction with FIGS. 1-9 and in particular in conjunction with a method in conjunction with FIG. 8. In step 420, download notification data is generated. In step 422, a download notification display is generated in response to the download notification data.

FIG. 11 is a flowchart representation of a method in accordance with the present invention. In particular, a method is presented for use in conjunction with one or more of the functions and features described in conjunction with FIGS. 1-10. In step 500, a unicast mode or a multicast mode is selected. In step 502, a video signal is generated that includes a unicast video signal when the unicast mode is selected and that includes a multicast video signal when the multicast mode is selected. In step 504, the video signal is transmitted to at least one mobile video device.

FIG. 12 is a flowchart representation of a method in accordance with the present invention. In particular, a method is presented for use in conjunction with one or more of the functions and features described in conjunction with FIGS. 1-11 and in particular in accordance with the method of FIG. 11. In step 510 location data is received from the at least one mobile video device, and step 500 includes selecting one of: the multicast mode, and the unicast mode, based on the location data.

In an embodiment of the present invention, step 500 includes selecting one of: the multicast mode, and the unicast mode, based on a comparison of the location data for a plurality of mobile devices. Step 500 can include correlating the location data to roads located in the vicinity of the at least one mobile video device or to places of interest located in the vicinity of the at least one mobile video device.

FIG. 13 is a flowchart representation of a method in accordance with the present invention. In particular, a method is presented for use in conjunction with one or more of the functions and features described in conjunction with FIGS. 1-12 and in particular in accordance with a method of FIG. 12. In step 520, a request for video content is received from the at least one mobile video device and step 500 includes selecting one of: the multicast mode, and the unicast mode, based on the request for video content. In an embodiment of the present invention, the request for video content is received from a single mobile video device and step 502 generates the multicast video signal that includes the video content in response to the request for the video content from the single mobile video device. Further, step 502 can generate the multicast video signal that includes the video content in response to the request for the video content from a plurality of mobile video devices.

Figure 14:
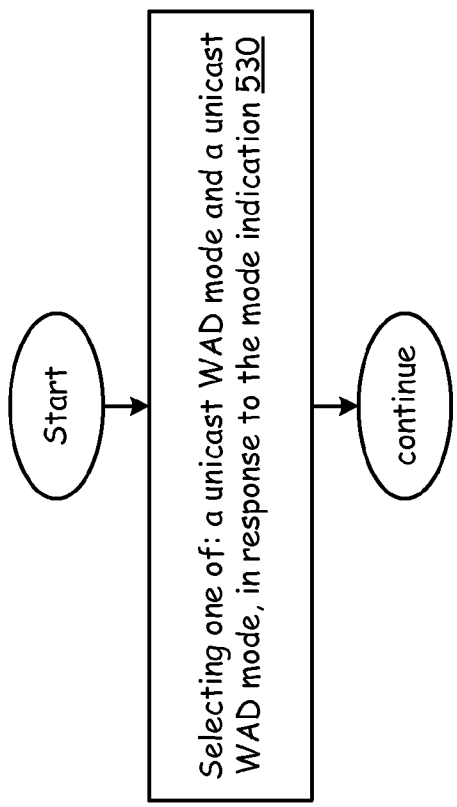
FIG. 14 is a flowchart representation of a method in accordance with the present invention.

FIG. 14 is a flowchart representation of a method in accordance with the present invention. In particular, a method is presented for use in conjunction with one or more of the functions and features described in conjunction with FIGS. 1-13 and in particular with a method in accordance with FIG. 11 and in the case where the video signal includes a mode indication. In step 530, one of: a unicast wireless access device (WAD) mode and a multicast WAD mode, is selected in response to the mode indication.

Figure 15:
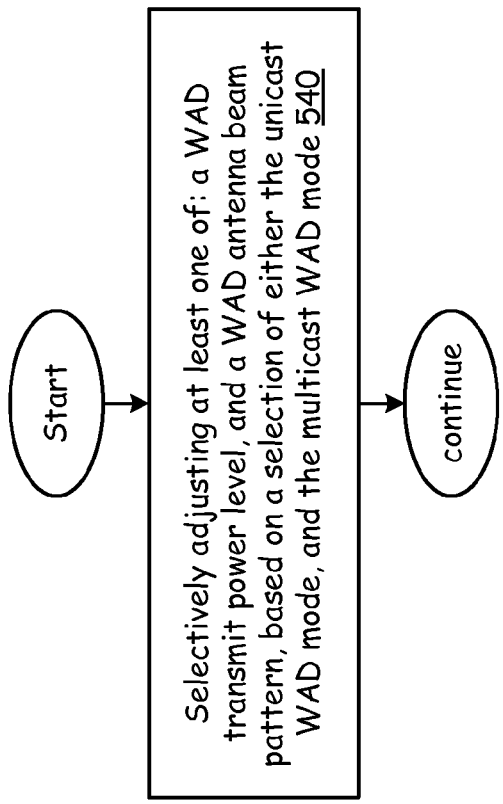
FIG. 15 is a flowchart representation of a method in accordance with the present invention.

FIG. 15 is a flowchart representation of a method in accordance with the present invention. In particular, a method is presented for use in conjunction with one or more of the functions and features described in conjunction with FIGS. 1-14 and in particular in conjunction with the method of FIG. 14. In step 540, at least one of: a WAD transmit power level, and a WAD antenna beam pattern, is selectively adjusted based on a selection of either the unicast WAD mode, and a multicast WAD mode.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), et cetera, to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, et cetera, provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A video server comprising:
    a memory;
    a processor coupled to the memory configured to:
    select a unicast mode in response to a request for video content from a single mobile video device via a network and that receives location data from a plurality of mobile video devices via the network;
    select a multicast mode in response to multiple requests for the video content from the plurality of mobile video devices and an analysis of the location data that indicates that the plurality of mobile video devices are within a common proximity; and
    generate a video signal for transmission to the single mobile video device via the network when the unicast mode is selected and for transmission to the plurality of mobile video devices via the network when the multicast mode is selected.

2. The video server of claim 1 wherein the video signal includes a mode indication that indicates one of: the unicast mode or the multicast mode.

3. The video server of claim 2 wherein a wireless access device (WAD) wirelessly transmits the video signal in accordance with a unicast WAD mode when the mode indication indicates the unicast mode.

4. The video server of claim 3 wherein the wireless access device wirelessly transmits the video signal in accordance with a multicast WAD mode when the mode indication indicates the multicast mode.

5. The video server of claim 4 wherein the wireless access device employs a first transmit power level in the unicast WAD mode, and a second transmit power level in the multicast WAD mode.

6. The video server of claim 4 wherein the wireless access device employs a first antenna beam pattern in the unicast WAD mode, and a second antenna beam pattern in the multicast WAD mode.

7. The video server of claim 1 wherein the processor selects the multicast mode based on correlating the location data to roads located in a vicinity of the plurality of mobile video devices.

8. The video server of claim 1 wherein the processor selects the multicast mode based on correlating the location data to places of interest located in a vicinity of the plurality of mobile video devices.

9. A method comprising:
    selecting, via a video server, a unicast mode in response to a request for video content from a single mobile video device;
    receiving, via a video server, multiple requests for the video content and location data from a plurality of mobile video devices;
    analyzing, via a video server, in response to the multiple requests, the location data to determine when the plurality of mobile video devices are within a common proximity;
    selecting, via a video server, a multicast mode when the plurality of mobile video devices are within the common proximity; and
    generating, via a video server, a video signal for transmission that includes a unicast video signal when the unicast mode is selected and that includes a multicast video signal when the multicast mode is selected.

10. The method of claim 9 wherein selecting the multicast mode includes correlating the location data to roads located in a vicinity of the plurality of mobile video devices.

11. The method of claim 9 wherein selecting the multicast mode includes correlating the location data to places of interest located in a vicinity of the plurality of mobile video devices.

12. The method of claim 9 wherein the video signal includes a mode indication, and the method further comprises:
    selecting one of: a unicast wireless access device (WAD) mode and a multicast WAD mode, in response to the mode indication.

13. The method of claim 12 further comprising:
    selectively adjusting a WAD transmit power level based on a selection of either the unicast WAD mode, or the multicast WAD mode.

14. The method of claim 12 further comprising:
    selectively adjusting a WAD antenna beam pattern based on a selection of either the unicast WAD mode, or the multicast WAD mode.

15. A video transmission system comprising:
    a video server module that selectively operates in a unicast mode in response to a request for video content from a single mobile video device via a network and that receives location data from a plurality of mobile video devices via the network and that selectively operates in a multicast mode in response to multiple requests for the video content from the plurality of mobile video devices and an analysis of the location data that indicates that the plurality of mobile video devices are within a common proximity;
    wherein the video server module generates a video signal that includes a unicast video signal when the video server module is in the unicast mode and that includes a multicast video signal when the video server module is in the multicast mode; and
    wherein the video server module sends the video signal to the single mobile video device via the network in the unicast mode and to the plurality of mobile video devices via the network in the multicast mode.

16. The video transmission system of claim 15 wherein the video signal includes a mode indication that indicates one of: the unicast mode or the multicast mode.

17. The video transmission system of claim 16 wherein a wireless access device (WAD) wirelessly transmits the video signal in accordance with a unicast WAD mode when the mode indication indicates the unicast mode and wherein the wireless access device wirelessly transmits the video signal in accordance with a multicast WAD mode when the mode indication indicates the multicast mode.

18. The video transmission system of claim 17 wherein the wireless access device employs a first transmit power level in the unicast WAD mode, and a second transmit power level in the multicast WAD mode.

19. The video transmission system of claim 15 wherein the video server module selects the multicast mode based on correlating the location data to roads located in a vicinity of the plurality of mobile video devices.

20. The video transmission system of claim 15 wherein the video server module selects the multicast mode based on correlating the location data to places of interest located in a vicinity of the plurality of mobile video devices.

* * * * *